United States Patent [19]
Balaschak et al.

[11] Patent Number: 5,090,239
[45] Date of Patent: Feb. 25, 1992

[54] STRAIN SENSING VALVE

[75] Inventors: James J. Balaschak, Duxbury; David E. Thrall, Marion, both of Mass.

[73] Assignee: Teledyne Industries, Inc., Los Angeles, Calif.

[21] Appl. No.: 642,929

[22] Filed: Jan. 18, 1991

[51] Int. Cl.$^5$ ............................................. G01M 19/00
[52] U.S. Cl. ................................................... 73/168
[58] Field of Search ................. 73/168, 862.29, 862.31, 73/862.35, 862.49, 862.54; 137/554

[56] References Cited

U.S. PATENT DOCUMENTS

| | | | |
|---|---|---|---|
| 3,929,009 | 12/1975 | Lutz et al. | 73/862.35 |
| 4,805,451 | 2/1989 | Leon | 73/168 |
| 4,932,253 | 6/1990 | McCoy | 73/151 |

Primary Examiner—Allan N. Shoap
Assistant Examiner—W. Morris Worth

[57] ABSTRACT

A strain sensing valve is provided with sensors on a depression on its stem, permitting calibration and electronic adjustment prior to assembly of the stem into the valve.

9 Claims, 1 Drawing Sheet

STRAIN SENSING VALVE

FIELD OF THE INVENTION

This invention relates to valves, and more particularly to valves carrying on a rotatable stem strain sensors.

BACKGROUND OF THE INVENTION

It has been known to use strain gage sensors on the rotating stems of valves, in order to sense during use strains therein.

SUMMARY OF THE INVENTION

It has been discovered that improved devices may be provided by mounting strain sensors in a circumferential groove in the valve stems.

It has been discovered, in another aspect, that the strain sensors are desirably calibrated after being mounted in the groove, and before the stem is assembled into the valve.

In preferred embodiments, the groove is of about the same depth as threads of the stem and the groove is filled with potting material.

PREFERRED EMBODIMENT

The presently preferred embodiment is shown in the drawings, following which its structure and operation are described.

DRAWINGS

STRUCTURE

Figure 1:
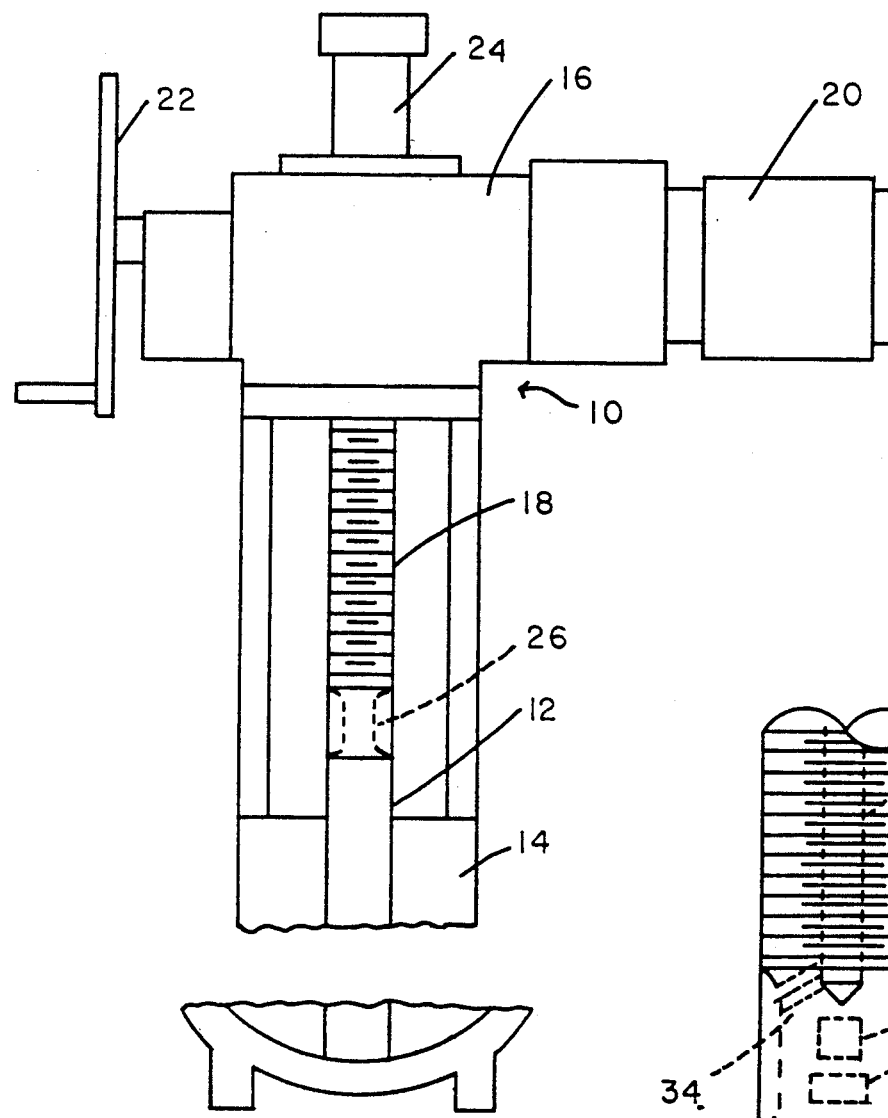
FIG. 1 is a side elevation, broken away and partially diagrammatic, of a valve according to the invention.

There is shown in FIG. 1 a valve indicated generally at 10.

Valve 10 includes stem 12 which is mounted in packing section 14 and carries at its lower end as is well known a gate for valving as stem 12 moves up or down.

Stem 12 is engaged in housing 16 by a nut driven by a worm engaging threads 18 for moving the stem. The nut may be selectively operated by motor 20 or hand wheel 22. The upper end of stem 12 is movable into housing extension 24 during operation.

Figure 2:
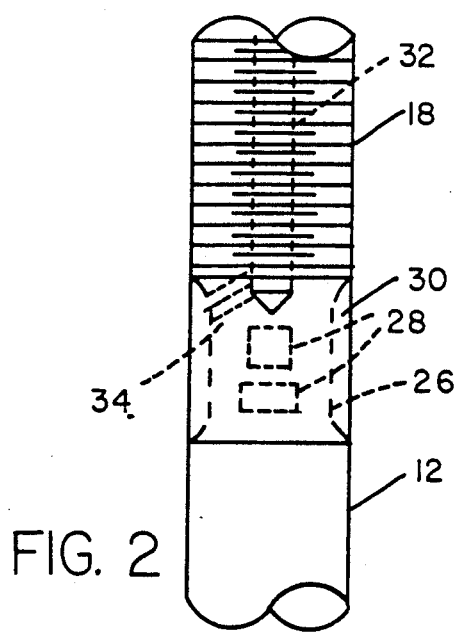
FIG. 2 is a corresponding view, slightly enlarged, and differently broken away, of a portion of the valve of FIG. 1.

Circumferentially disposed in stem 12 is groove (recess) 26, the smallest diameter of which is the same as the root diameter of threads 18. Mounted on the flat surface of groove 26 are four strain gages 28, two as shown in FIG. 2 with centerlines on one longitudinal line in the surface of the groove, and the other two on a second such longitudinal line spaced 180° around groove 26 from the first longitudinal line. These gages are oriented and connected into a Wheatstone bridge in the manner well known for sensing strain in tension of stem 12.

Groove 26 is filled with potting material 30 to a diameter the same as that of the largest adjoining diameter of the remainder of stem 12.

Connecting with groove 26 for support therein of electrical cable wires to gages 28 are longitudinal hole 32 and generally transverse hole 34, connecting with hole 32 and groove 26, and at an angle to the centerline of the former such that the centerline of the transverse hole 34 extends simultaneously toward groove 26 and the gate of the valve.

Manufacture

In manufacture, the sensors are calibrated before being assembled into the valve. Variations such as of stem size, stem Young's modulus, and sensor parameters may thus be cumulatively calibrated. If desired, at the same time the relation of electrical output to load may be adjusted ("spanned"), and temperature compensation (by means well known, as by adding resistors) may be provided.

Operation

In operation there is thus obtained a highly reliable output signalling strain in stem 12 during operation.

Other Embodiments

Other embodiments of the invention will occur to those skilled in the art.

Thus, strain gages may be oriented differently in the groove, so as to measure strain in torque rather than tension, the proper orientation being well known in the art. The valve may be other than a gate valve.

What is claimed is:

1. A valve assembly comprising a stem for transferring movement to a valve element
    said stem including a threaded portion and a smooth unthreaded portion,
    said smooth unthreaded portion having a recessed mounting surface,
    strain gages permanently mounted on the recessed mounting surface of said smooth unthreaded portion, and
    said stem passing through a packing material in which said smooth unthreaded portion is received in an opening through said packing material, said opening having a diameter larger so as to permit said mounting surface to pass therein.

2. The valve assembly of claim 1 in which said mounting surface is in a groove.

3. The valve assembly of claim 2 in which said mounting surface is the cylindrical bottom of said groove.

4. The valve assembly of claim 3 in which said groove is filled with potting material to a diameter the same as that of the largest adjoining diameter of the remainder of the stem.

5. The valve assembly of claim 1 in which a cable acceptance hole having one portion which extends longitudinally through said stem and a second portion which extends transversely through said stem to said mounting surface.

6. The valve assembly of claim 5 in which said second portion of said hole is at an acute angle to the centerline of said stem.

7. The method of making a strain sensing valve which comprises
    manufacturing a valve stem having a threaded portion and a smooth unthreaded portion having a recessed mounting surface said stem also having a cable acceptance hole including one portion extending longitudinally through said stem and a second portion extending transversely through said stem to said mounting surface,
    permanently mounting strain sensors on said mounting surface and connecting said sensors to wires of an electrical cable within said cable acceptance hole, and thereafter assembling said stem into a valve.

8. The method of claim 7 in which said sensors are calibrated after said mounting and before said assembling.

9. The method of claim 7 in which said sensors are compensated for temperature after said mounting and before said assembling.

* * * * *